May 15, 1962 C. T. BREITENSTEIN 3,034,685
MANIFOLD DISPENSING VALVE
Filed May 13, 1957 4 Sheets-Sheet 1

INVENTOR.
Charles T. Breitenstein
BY
Attorney

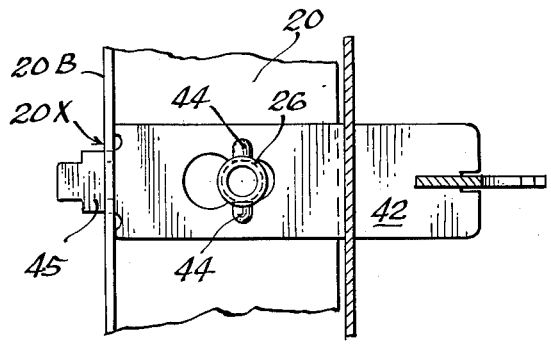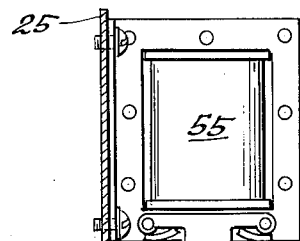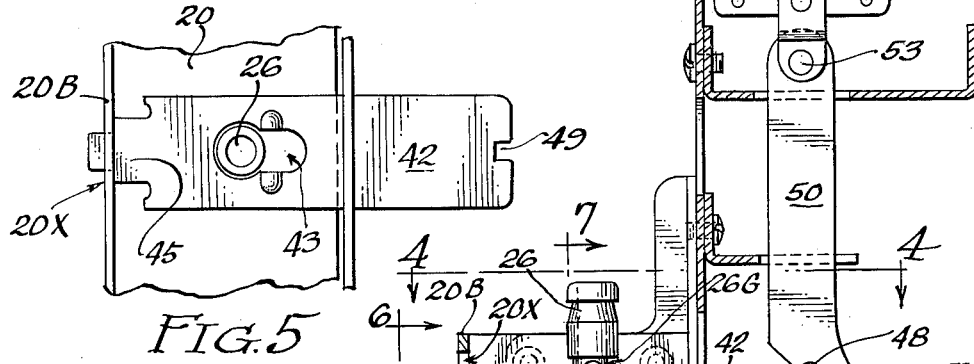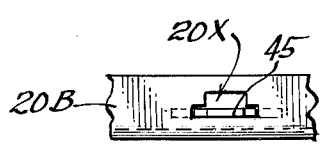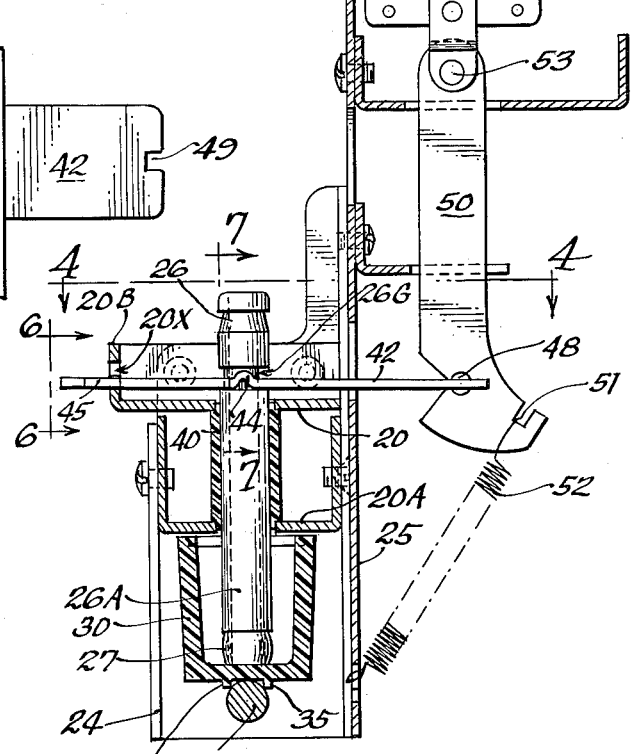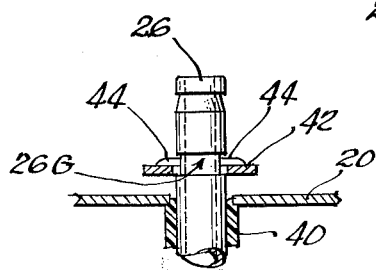

May 15, 1962   C. T. BREITENSTEIN   3,034,685
MANIFOLD DISPENSING VALVE
Filed May 13, 1957   4 Sheets-Sheet 3

INVENTOR.
Charles T. Breitenstein
BY
Attorney

May 15, 1962　　　C. T. BREITENSTEIN　　　3,034,685
MANIFOLD DISPENSING VALVE

Filed May 13, 1957　　　　　　　　　　　　　　4 Sheets-Sheet 4

INVENTOR.
Charles T. Breitenstein
BY
Attorney

United States Patent Office 3,034,685
Patented May 15, 1962

3,034,685
MANIFOLD DISPENSING VALVE
Charles T. Breitenstein, Chicago, Ill., assignor, by mesne assignments, to The Seeburg Corporation, Chicago, Ill., a corporation of Pennsylvania
Filed May 13, 1957, Ser. No. 658,826
11 Claims. (Cl. 222—132)

This invention has as its principal object the provision of a simplified manifold valve structure especially adapted to use in coin-controlled beverage dispensers—especially those capable of affording a selection covering four or more choices, for example, hot coffee, black or with cream; hot chocolate with or without cream; soups, bouillon, and the like.

Hygienic standards require constructions which permit parts subject to contamination to be inspected and cleaned.

The present disclosures afford a valve unit in which the valves themselves, coacting with a common manifold, are of such simple construction and cooperative character that all valves and the manifold itself may be easily removed and replaced in a matter of seconds.

More particular objects relate to details of the construction, operation, and coaction of the component parts to be described, and to the control means therefor, all of which will become more apparent as the following description proceeds in view of the annexed drawings, in which:

FIG. 3 is a vertical transverse section to enlarged scale, taken on lines 3—3 of FIG. 1;

FIG. 4 is an enlarged horizontal sectional detail of one of the valve lifters;

FIG. 5 is a fragmentary plan detail similar to FIG. 4 but showing the valve member freed for removal as seen along lines 4—4 of FIG. 3;

FIG. 6 is a fragmentary elevational detail of the lifter tail lock looking along lines 6—6 of FIG. 3;

FIG. 7 is a vertical sectional fragment of part of a valve member as seen along lines 7—7 of FIG. 3;

Figure 1:
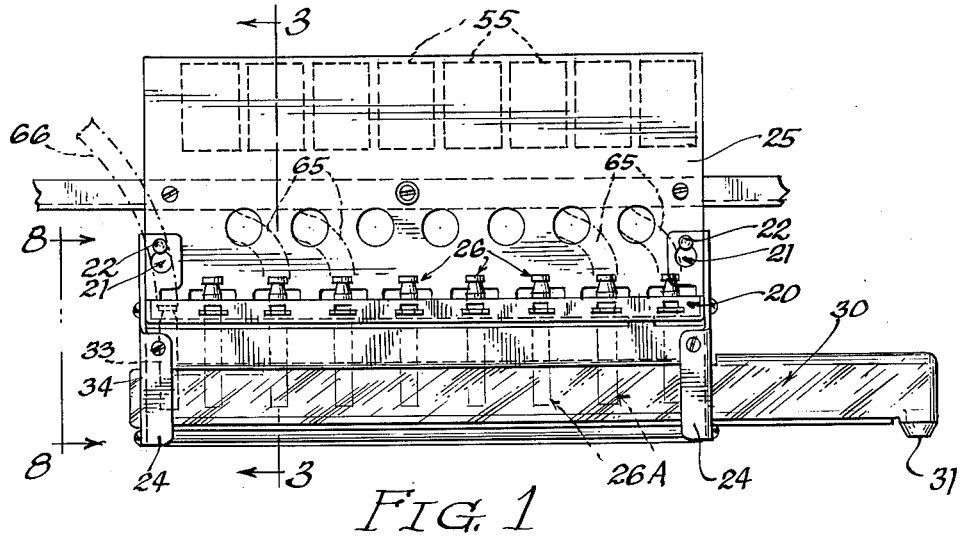
FIG. 1 is a front elevation of the complete valve assembly.

The valve unit depicted in FIG. 1 consists essentially of a long bed plate 20 removably hung, by keyhole slots 21, on headed lugs 22, on the side of a vertical mounting plate member 25.

Beneath the bed plate is a long boat-shaped manifold member 30 having a discharge nozzle 31 at any of its ends, and positioned by brackets 24 to underlie a series of tubular valve members 26, the lower portions 26A of which project down into the chamber of the manifold (see also FIG. 3), said manifold also being referred to as a "boat" by reason of its analogy to the laboratory dishes known as "boats."

Figure 11:
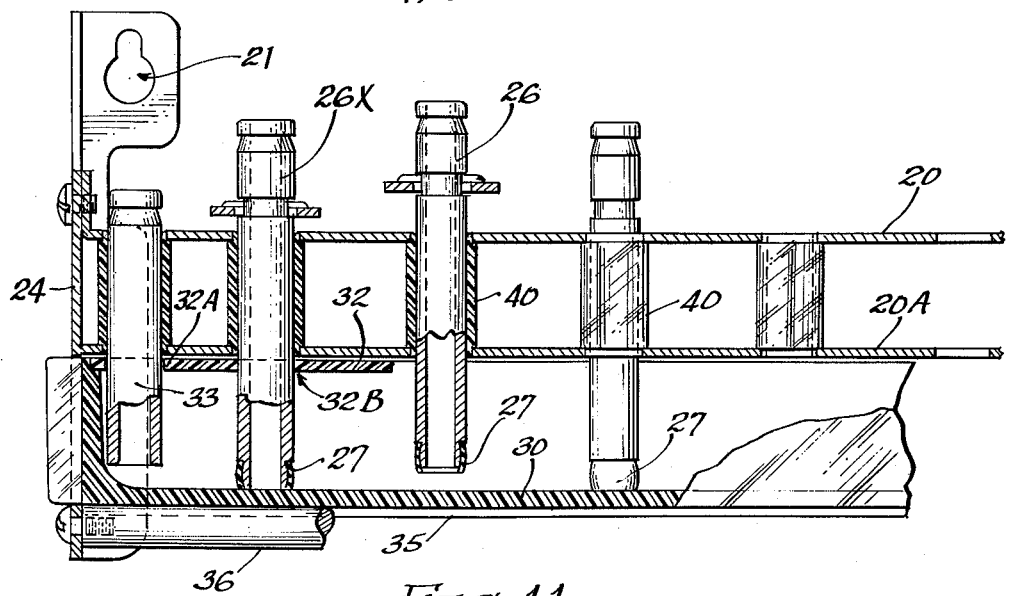
FIG. 11 is an enlarged vertical sectional fragment through a portion of the valve assembly and manifold.
Figure 12:
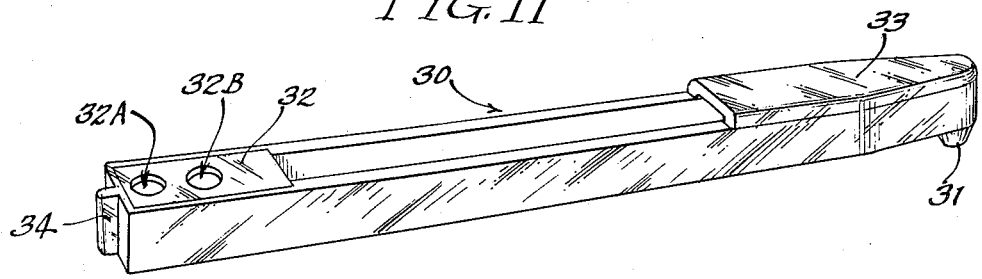
FIG. 12 is a perspective detail of the plastic valve manifold.

The manifold 30, as depicted in FIG. 12, comprises an elongated, narrow channel member molded from a suitable plastic and having an open top except for end closures 32 and 33, which serve to protect exposed portions of the manifold and as splash guards. The closure 32 has two openings 32A, 32B, which admit a hot-water feed and connection nipple 33 (FIG. 11) and the first valve member 26X of the series.

Figures 8, 9:
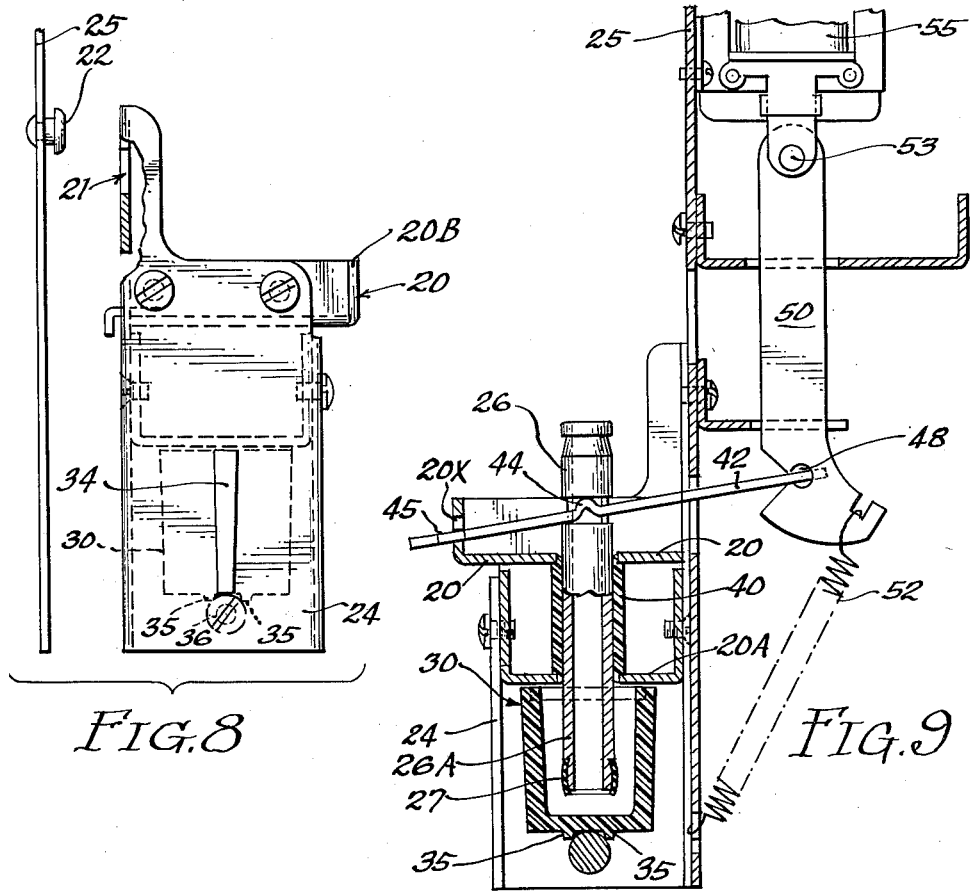
FIG. 8 is an endwise elevational detail (with parts shown in section) of the valve bed looking in the direction of lines 8—8 of FIG. 1.
FIG. 9 is a vertical sectional operating detail similar to FIG. 3 but showing a working valve in raised, open condition.

At the left outside end-wall of the manifold is an integral positioning rib 34 which keys into a slot in one of the brackets 24 (FIG. 8).

On the underside of the manifold (FIG. 3) are two spaced longitudinal seating ribs 35, which straddle a long supporting rod 36 carried by brackets 24.

Referring to FIGS. 3 and 11, the bed plate structure 20 includes a lower plate 20A and clamped between these plates at intervals are valve sleeves 40 in each of which is fitted one of the vertically shiftable valve members 26.

The valve members 26 when in lowered condition seat with their lower ends resting flush against the flat floor of the manifold and are thereby closed; and lifting of any such member constitutes an opening of that valve and an admission of a supply of a beverage fluid into the manifold wherein it will admix with another liquid, for example, hot water, and this mixture in turn will be discharged from the manifold nozzle 31. Thus the manifold boat or chamber 30 constitutes a mixing chamber.

At the lower end of each valve member 26 is a seating ring 27 of rubber or synthetic seal-forming material which will seat against the inside surface or floor of the manifold member or boat when the appertaining valve member is in lowered condition, e.g. as in FIG. 3.

Means for selectively imparting opening and closing vertical movements to the individual valve elements comprises, as shown in FIG. 3, an actuating or lifter plate 42 (FIGS. 4 and 5 also) for each valve member 26, each plate having near its mid-region a keyhole slot 43 flanked by a pair of bosses 44 along its straight portions, and as viewed in FIG. 7, each valve member is provided with a circumferential groove 26G into which the keyhole slot formations in the appertaining lifter plate fit, said groove being oversize to fit loosely with the slot, and said bosses 44 affording a tighter fit when the lifter plate is pushed into interfit, as in FIG. 4, with its valve stem, substantially in the condition of FIGS. 3 and 4, in which condition the reduced tail portions 45 of each lifter plate (FIGS. 3, 4, and 7) are slidably keyed into complementary notch formations 20X in the upper bed plate rim 20B.

The forward extremities of each lifter plate 42, referring particularly to FIG. 3, project through openings 25A (FIG. 2 also) in the mounting plate 25 and have notch means 49 keying rockably into slots 48 at the foot of an appertaining driving member or actuating lever 50 which is normally urged downwardly by a corresponding spring 52 anchored at one end on plate 25 and at the other on the toe 51 of said lever.

The upper end of each actuating lever 50 is pivotally connected, as at 53, to the end of a solenoid plunger 54 adapted to be raised by the corresponding solenoid coil 55 when the latter is energized; such condition being illustrated in FIG. 9, which depicts the resultant raising of the appertaining valve lifter plate 42 and the consequent raising of the corresponding valve element 26 and unseating of its sealing poppet or ring 27 from the bottom or floor portion of the manifold chamber or boat 30, thus opening that particular valve to admit a corresponding beverage liquid or concentrate to the manifold. De-energization of the solenoid permits the spring 52 to restore the lever 50, lifter 42, and valve member 26 to normal condition.

Figure 2:
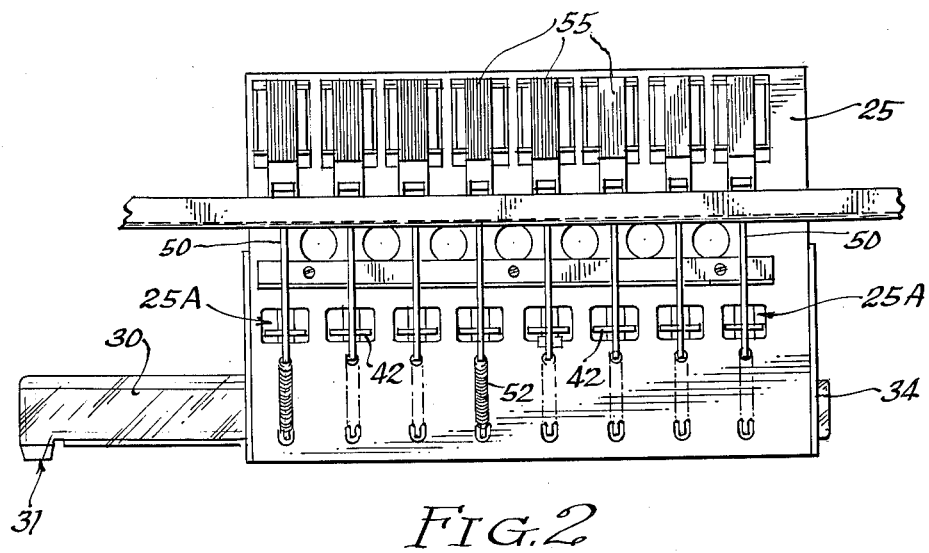
FIG. 2 is a rear elevation of the unit shown in FIG. 1.

There may be as many individual valve units as desired, there being eight shown in the rear view of FIG. 2, for instance. The hot-water outlet 33 (FIG. 11) is fed from a valve 97—98 located elsewhere in the machine.

The several valve members 26 are respectively to be connected by non-rigid rubber or like tube 65, indicated in dotted lines in FIG. 1, to supply bottles or tanks (not shown) of liquid flavoring or beverage concentrates, such as coffee, soup, chocolate and the like, which are arranged preferably to feed by gravity into said valve members. The special spigot 33 is to be connected by a similar flexible tube 66 to a source of hot water, the flow of which is controlled by a valve 98 operated by solenoid 97 (FIG. 13).

The operation of the device is such that a selected "flavor" solenoid 55 will be energized first to raise the corresponding valve member 26 and admit a predetermined amount of flavor or beverage concentrate into the manifold, and thereafter the hot-water valve 98 will be actuated by its solenoid means 97 to admit a quantity of hot water to wash-down and mix with the concentrate for discharge from nozzle 31. To this end, the entire unit is usually mounted at a slight angle so as to pitch the manifold to lower the nozzle portion, thereby permitting residual water and liquid to gravitate to the nozzle.

Figure 13:
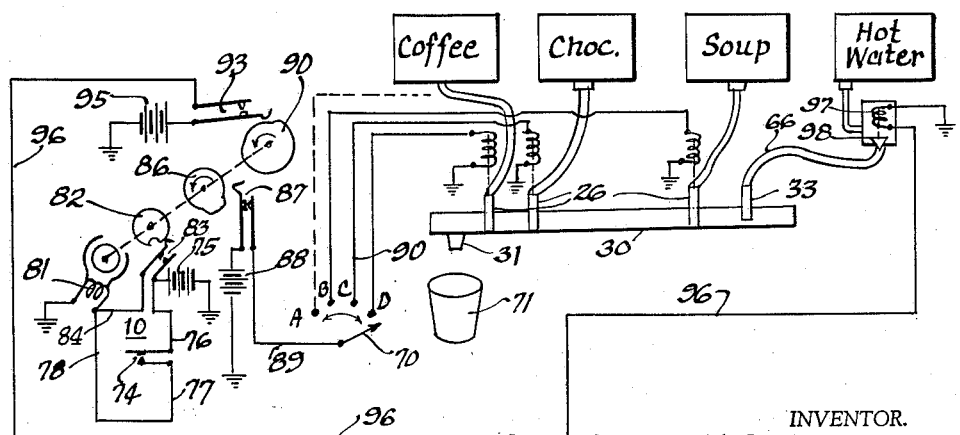
FIG. 13 is a circuit diagram.
Figure 10:
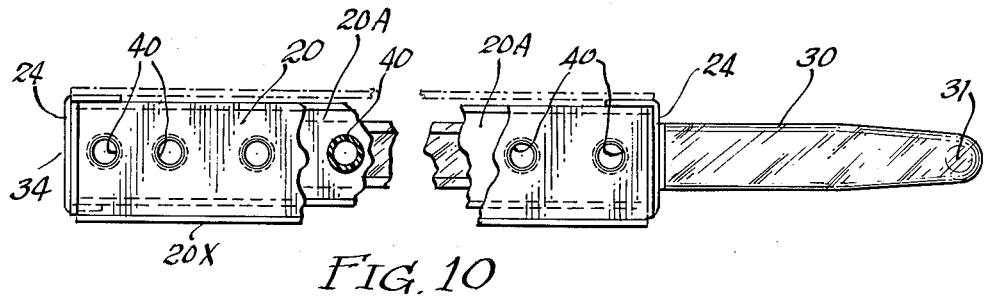
FIG. 10 is a top plan view of the plastic manifold unit.

The novel manifold valve means is intended for use in a coin-controlled multi-selection beverage dispensing machine employing a control circuit such as illustrated in FIG. 13, in the operation of which the patron first makes a selection, such as "chocolate" by turning the selector switch 70 to position "C" according to instructions on the face of the machine; and thereafter he deposits the specified coin to actuate the coin switch 74, which will start the dispensing cycle by momentarily connecting power from the power source 75 (indicated for convenience as battery) via conductor 76, the contacts closed of switch 74, conductors 77, 78, to cycle motor 81, thereby starting the latter.

As the cycle motor starts, a cycling cam 82 closes cycle switch 83 thereby connecting running power from source 75 via conductor 84 joined to conductor 78 and motor 81, as a result of which the motor will continue to run until the cycle of its cam 82 is completed to re-open cycle switch 83.

In the first phase of each dispensing cycle, the hot water cam 90 will close switch 93 and connect power from source 95 via conductor 96 to energize hot water solenoid 97 thereby injecting hot water via the nipple or spigot member 33 into the manifold. This initial injection usually occurs within 5 degrees or so of the start of the cycle, and after the hot water valve has been open long enough to assure a "coating" of water on the floor of the manifold at the time the flavor or concentrate is injected, which action usually occurs in the region of 80 degrees from the start of the cycle.

In this example the chocolate syrup will be admitted by energization of the particular solenoid 55C which corresponds to the setting of selector wsitch 70, owing to closure of switch 87 by cam 86, which connects power from source 88 via conductor 89, switch 70 and conductor 90 to said solenoid 55C. This valve remains open for the next 55 or 60 degrees while the hot water valve continues open until about 270 degrees of the cycle has been completed, so that a predetermined volume of syrup and of water will be discharged into and from the manifold to fill cup 71. The cycle terminates with opening of switch 83 at full 360 degrees of travel of the cam shaft.

The valve structure disclosed is simple to assemble and is easily disassembled for hygienic and servicing purposes.

The entire set of valves, as well as the manifold itself, may be taken apart in a matter of seconds. To do this, the service man usually places a small cut-off clip on each rubber delivery tube 65 and then slips the delivery end of each said tube off its nipple on the several valve stems 26. Thereafter the entire bracket subassembly may be lifted off plate 25 at 21—22; and the tail 45 of each valve lifter plate 42 may be lifted in its slot 20X and moved forwardly from the condition of FIG. 4 to that of FIG. 5, whereupon the valve members 26 may be lifted wholly free. By reason of the notched shape of the tail slots 20X, each valve lifter plate 42 will remain locked-up in the stem-releasing condition of FIG. 5 until restored, when the valve unit or subassembly is left in position on plate 25 by reason of the action of springs 52; and, assuming that one or more valve stems or tubes 26 have been replaced, it is merely necessary to energize all solenoids at once (or in succession) to trip the lifters out of locked-up condition, since such action will throw the tail of the lifter downwardly out of the narrower portion of the notch. This is an advantage to the service man.

When all valve stems 26 have been removed, the service attendant may then slide the manifold 30 toward the right (FIG. 1) and free of the unit.

Customarily, a complete set of valve stems 26 and a fresh manifold 30 (protected by sterilized wrappings until ready for use) will be used for replacement purposes, and when the new manifold is installed beneath the bed and all valve members 26 are dropped into place, the several lifter plates 42 may be snapped home by simply brushing the finger with downward bias along all of the tail pieces 45.

I claim:

1. A manifold valve structure and mixing chamber comprising an elongated manifold receptacle with an inside integral floor bottom and open top portions and having a discharge passage near one end and constituting a part of the valve structure and a mixing chamber; a supporting means mounting said manifold receptacle at a downward inclination toward said passage, said supporting means including tubular sleeves serially arranged above and in alignment with said top portions along a portion of the length of the manifold receptacle; a vertically reciprocable and removable tubular valve member in each said sleeve depending into the receptacle, a lifter plate removably embracing an upper free end region of each valve member and each mounted with a tail end disposed on said supporting means to rock upwardly and lift the appertaining valve member to open condition from a normally lowered condition in which the lower end thereof seats and closes itself against the inside floor bottom of said manifold receptacle; and actuating means for said lifters and including selectively operable electromechanical means operable to move any said lifter upwardly to open condition, or downwardly to seated closed condition, each said tubular valve member being adapted to have an upper end portion thereof connected by movable duct means to a particular corresponding source of liquid to be admitted to said manifold receptacle selectively from one of a plurality of said sources, responsive to opening operation of the corresponding actuating means aforesaid for intermixture of liquids from any two or more of said sources by confluent movement toward and through said discharge passage.

2. A mixing valve comprising a chamber having a discharge passage and floor; a plurality of valve tubes mounted to reciprocate with their lower ends in said chamber at right angles to said floor and with a bottom exit end of each tube engageable with a floor portion in the chamber to close off the appertaining exit ends; each said tube being adapted for connection with a movable duct member to supply a fluid thereto for admission to said chamber responsive to raising of the appertaining tube from closing contact with the floor portion as aforesaid; and means including a rockable member cooperable with each said tube and operable to lift and seat the same in valve-opening and closing operation.

3. In a valve structure having a chamber and a tubular valve member and means supporting same for movement up and down therein to close off the lower end thereof against a floor portion in the chamber, or open said lower end by raising the valve member from said floor, the upper end region of the tubular member being adapted for connection with a flexible feed tube, actuating means for said valve member including an elongated rockable member having at a point between its ends a separable driving interfit with said upper end region of the tube; means providing a slotted rocking fulcrum for rockably and slidably seating one end region of said rockable member, said one end being shaped to interfit with said fulcrum means in two positions, a first one of which is a seated condition and the second of which is a releasing condition in said interfit; and electromechanical actuating means operatively connecting with the opposite end regions of said rockable member for rocking the same to reciprocate the valve tube as aforesaid in opening and closing action; and spring means normally acting on the rockable member to hold the tubular valve member in closing contact with the floor as aforesaid and also acting to urge the rockable member into seated relation with said slotted fulcrum.

4. A valve structure according to claim 3 in which said fulcrum means includes a member in which is formed a slot having a greater width at one region than at another region thereof, and said one end of the rockable member is formed as a reduced tail portion passing freely through the wider slot region in said second position but only a limited distance through the narrower slot region in said first position, whereby the rockable member may be slidably displaced lengthwise away from the slot into said releasing condition for separation from the appertaining valve tube, and the tail portion may be moved laterally into the narrower slot region, whereby the rockable member will be releasably maintained in said releasing condition and may be freed therefrom by an opposite lateral movement of at least said tail portion thereof.

5. A construction according to claim 4 in which said actuating mechanism includes an operating lever and a spring operatively connecting with the end region of said rockable member remote from said slot and normally urging said rockable member to dispose the tail portion thereof in a direction generally back into the slot in such manner that when the rockable member is in said releasing condition and maintained therein by the narrower portion of the slot as aforesaid it is merely necessary to push the tail portion of the rockable member laterally in the direction of the wider portion of the slot to effect automatic spring-urged restoration thereof to effective operating position and relation with the corresponding valve tube.

6. In a valve structure, mixing valve means providing a set of vertically extending valve sleeves arranged in serial alignment; a valve tube reciprocably carried in each sleeve with respectively upper and lower end portions exposed beyond the ends of the appertaining sleeves; an elongated manifold boat having a top opening along a substantial part of its length, a flat floor underlying said top opening, and a discharge port at one end thereof; an individual operating lever for each valve tube cooperatively associated with the upper end portion thereof and means mounting said levers for movement respectively back and forth to seat the lower end of the appertaining tube sealingly against the underlying floor of the manifold boat or raise the same from said floor to open the flow therethrough; and mounting means supporting said boat in an approximately horizontal position with said discharge port at a lower level than remaining portions thereof, and removably supporting said valve means above said top opening of the boat with said valve tubes in close proximity at their lower ends for movement by an operating lever as aforesaid to sealingly engage and disengage the floor in lowered condition as aforesaid, said valve tubes each being adapted to have a flexible conduit means connected to their upper ends for valved release of fluid into the manifold boat.

7. In a valve structure of the type including a plurality of valve tubes movable axially up and down to effect a sealing or opening of their lower ends to flow from a connection to their respective upper ends, improved actuating mechanism for the valve tubes comprising: means providing a flat elongated lever for each tube and having an elongated slot between its ends, one of which ends is a tail end, and the other of which is a working end, and slidably coupling with an upper end portion of an appertaining one of said tubes; a fulcrum member running along behind all said tubes and closely confronting the tail ends of all said levers and having a series of fulcrum slots each aligned with one of said tail ends to receive the latter upon sliding of the appertaining levers relative to their tubes into said slots whereby to lodge said tails therein, the said working ends of each lever being movable up and down to rock the same on the corresponding tail ends in said fulcrum slots to reciprocate the appertaining valve tube in valve action; and shoulder means at each lever tail limiting the movement of the same into its fulcrum slot.

8. A valve structure according to claim 7 further characterized by the provision of lever actuating means comprising: driving members each situated for movement in juxtaposition with the working end of one of the levers to rock the latter in valve-tube operating motion; a separable coupling between each said end and the appertaining driving member; spring means acting on each said driving member in a direction to yieldingly prevent uncoupling thereof from the corresponding lever and also in the direction to urge the tail end of said lever into its fulcrum slot; said driving members permitting sufficient lever movement in a direction outward of said slots to position the respective lever and tubes in relation for uncoupling.

9. A construction according to claim 8 in which each said fulcrum slot has a communicating narrower holding slot portion above the same and into which a portion of the corresponding tail end, less than the whole thereof, will fit provided said lever is moved to a predetermined position outwardly of its fulcrum slot and is also raised into said holding slot whereby said lever is releasably locked up at said position, said valve sleeve being removable from coupled engagement from said lever at said position, said driving member being movable in a certain direction to trip its lever from said locked-up condition for urgence back into valve-operating position therein by said spring means.

10. In a valve structure, a reciprocable valve tube and a support mounting same for reciprocation toward and away from a relatively stationary surface opposite a discharge end of the tube to effect closing and opening of the tube in valve action, said tube having an annular groove remote from said discharge end thereof; an elongated actuating lever for said tube having a notched endwise tail portion and a tube-engaging opening between its ends fitting down about the tube, said opening having a narrowed portion displaced along the length of the lever to fit into said groove by lengthwise shifting movement of the lever relative to said tube and support when embracing the tube as aforesaid; means on said support providing a complementary notched seat for said tail portion, the same being shaped with an enlarged and a narrowed notch portion to receive said tail portion by longitudinal shifting of the lever relative thereto when fitted to embrace the valve tube as aforesaid, and said seating notch further securing notched parts of said tail portion of the lever therein on movement of the lever to dispose the narrowed portion of the tube-engaging opening in the annular tbe groove as aforesaid, whereby the lever may be removably assembled in operative interlocking engagement with the valve tube and support.

11. A mixing valve structure for beverage and like dispensers comprising an elongated receptacle having a top opening with a flat, horizontal, inside bottom floor therebelow and constituting an integral bottom wall of the receptacle, and a discharge passage leading therefrom near one end thereof, said receptacle being adapted to receive at least two liquid ingredients to be intermixed therein and flow from said passage; supporting means including a vertical guide for a valve tube and adapted to overlie said receptacle and including a narrow elongated member adapted to underlie the receptacle in a direction along its length and removably mounting said receptacle with its top opening aligned beneath said guide, and in a manner permitting lengthwise withdrawal of the receptacle from beneath the guide when the valve tube is raised a certain distance; a valve tube freely vertically reciprocable in said guide and having an upper open end exposed for connection with a flexible ingredient supply duct and a lower open end disposed to rest normally upon said floor in closing relation thereagainst responsive to downward movement of the tube to close off liquid flow therefrom; said flow being initiated by upward displacement of said tube to free the lower end thereof from closing engagement against said floor, said receptacle being adapted to receive at least a second liquid ingredient through said top opening for intermixture with the liquid flow aforesaid, said supporting means inclining the receptacle in a direction toward one of its lengthwise ends, and said receptacle having a discharge passage adjacent the lowermost end thereof and remote from said tube.

References Cited in the file of this patent

UNITED STATES PATENTS

| 2,755,006 | Small et al. | July 17, 1956 |
| 2,848,140 | Gabrielsen | Aug. 19, 1958 |
| 2,901,002 | Small et al. | Aug. 26, 1959 |

UNITED STATES PATENT OFFICE
CERTIFICATE OF CORRECTION

Patent No. 3,034,685                              May 15, 1962

Charles T. Breitenstein

It is hereby certified that error appears in the above numbered patent requiring correction and that the said Letters Patent should read as corrected below.

Column 3, line 54, for "wsitch" read -- switch --; column 6, line 64, for "tbe" read -- tube --; column 8, line 13, for "Aug. 26, 1959" read -- Aug. 25, 1959 --.

Signed and sealed this 25th day of December 1962.

(SEAL)
Attest:

ERNEST W. SWIDER                              DAVID L. LADD
Attesting Officer                                 Commissioner of Patents